United States Patent
Wu et al.

(10) Patent No.: US 8,189,555 B2
(45) Date of Patent: May 29, 2012

(54) COMMUNICATIONS METHODS AND APPARATUS FOR SUPPORTING COMMUNICATIONS WITH PEERS USING MULTIPLE ANTENNA PATTERNS

(75) Inventors: Xinzhou Wu, Monmouth Junction, NJ (US); Pramod Viswanath, Champaign, IL (US); Saurabha Tavildar, Jersey City, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 644 days.

(21) Appl. No.: 12/367,293

(22) Filed: Feb. 6, 2009

(65) Prior Publication Data

US 2010/0202434 A1    Aug. 12, 2010

(51) Int. Cl.
*H04J 3/00* (2006.01)
(52) U.S. Cl. ........................................ 370/345
(58) Field of Classification Search .................. 370/310, 370/328, 331, 332, 334, 345; 455/73, 550.1, 455/561, 562.1
See application file for complete search history.

(56) References Cited

U.S. PATENT DOCUMENTS

| | | | | |
|---|---|---|---|---|
| 6,640,087 B2 * | 10/2003 | Reed et al. | ................... | 455/11.1 |
| 7,177,644 B2 * | 2/2007 | Smith et al. | ................... | 455/445 |
| 7,418,274 B2 * | 8/2008 | Hood, III | ................... | 455/562.1 |
| 7,428,408 B2 * | 9/2008 | Cha et al. | ................... | 455/276.1 |
| 7,855,997 B2 * | 12/2010 | Adams et al. | ................. | 370/337 |
| 2003/0119558 A1 * | 6/2003 | Steadman et al. | ............ | 455/562 |
| 2005/0063319 A1 * | 3/2005 | Kyperountas et al. | ........ | 370/254 |
| 2006/0178116 A1 * | 8/2006 | Qi et al. | ....................... | 455/90.3 |
| 2008/0198829 A1 | 8/2008 | Cheng et al. | | |
| 2009/0034489 A1 | 2/2009 | Adams et al. | | |
| 2010/0054180 A1 * | 3/2010 | Eldering | ....................... | 370/328 |

OTHER PUBLICATIONS

International Search Report—PCT/US2010/023415—International Search Authority—European Patent Office, May 12, 2010.
Written Opinion—PCT/US2010/023415, International Search Authority, European Patent Office, May 12, 2010.

* cited by examiner

*Primary Examiner* — Chi Pham
*Assistant Examiner* — Robert Lopata
(74) *Attorney, Agent, or Firm* — James O'Hare; Paul S. Holdaway

(57) ABSTRACT

Methods and apparatus for communicating information, e.g., peer discovery information, to peer communications devices using multiple antenna patterns at different times are described. One exemplary method includes transmitting first peer discovery information during a first period of time using a first antenna pattern, and transmitting second peer discovery information during a second period of time using a second antenna pattern which is different from the first antenna pattern. In at least some embodiments the first antenna pattern is a beam antenna pattern and the second antenna pattern is an omni-directional antenna pattern. In some embodiments, an omni-directional antenna pattern is used at least 50% of the time. This allows devices near the transmitting device to quickly obtain peer discovery information while devices further away make take longer to obtain the peer discovery information since they may need for a beam pattern facing their direction to be used.

17 Claims, 8 Drawing Sheets

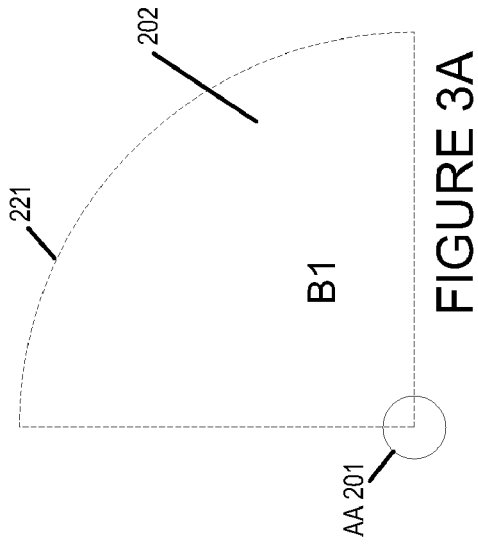
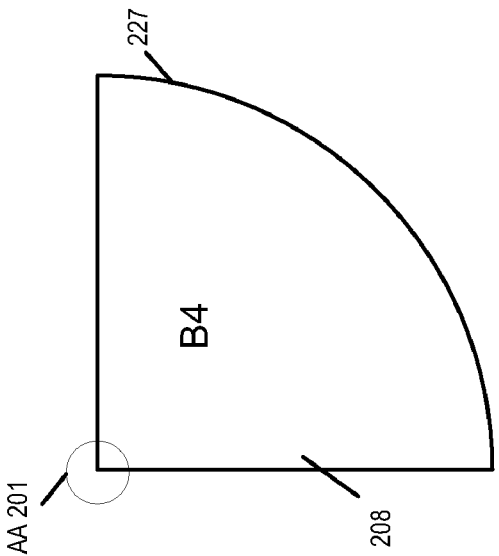
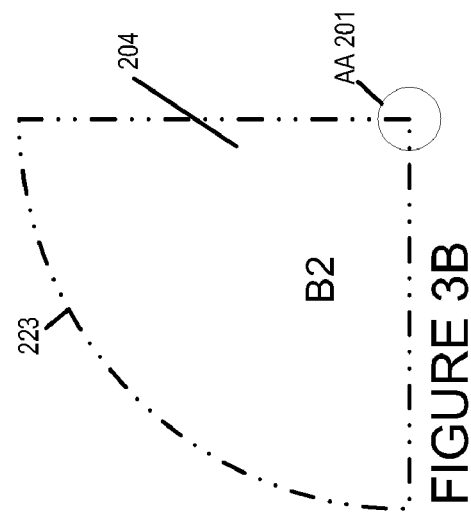
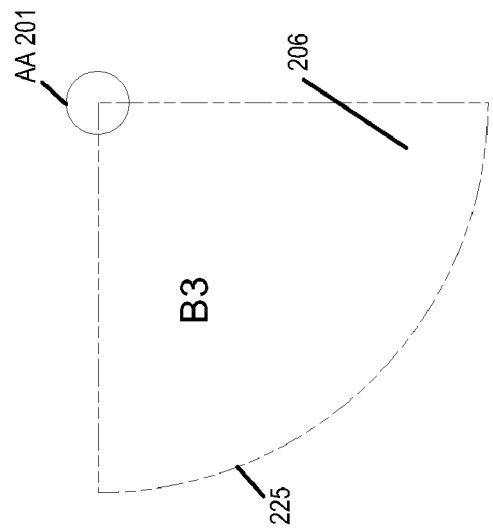

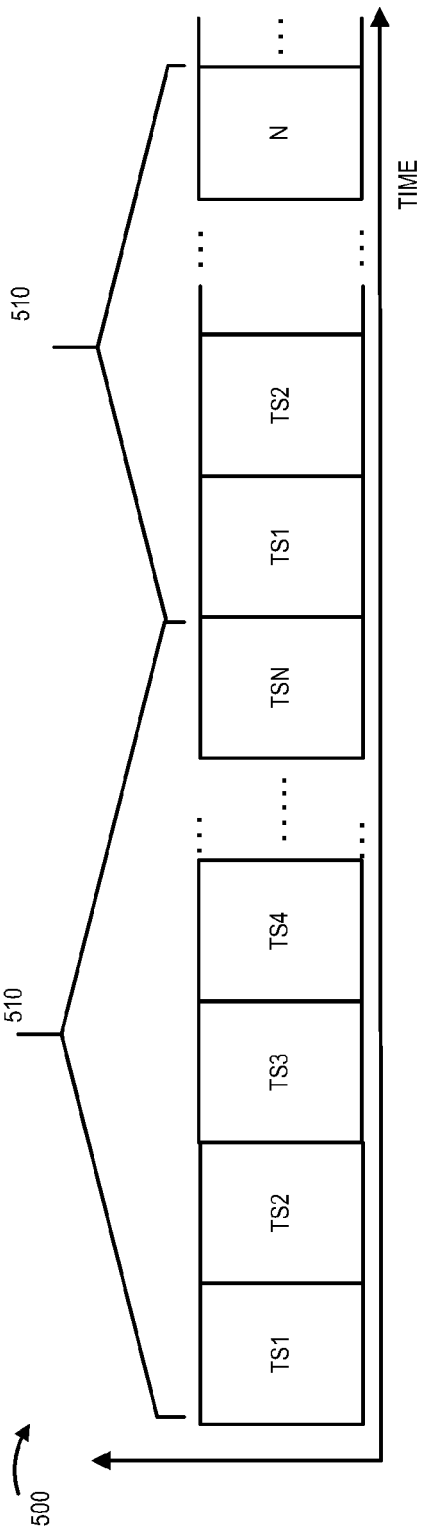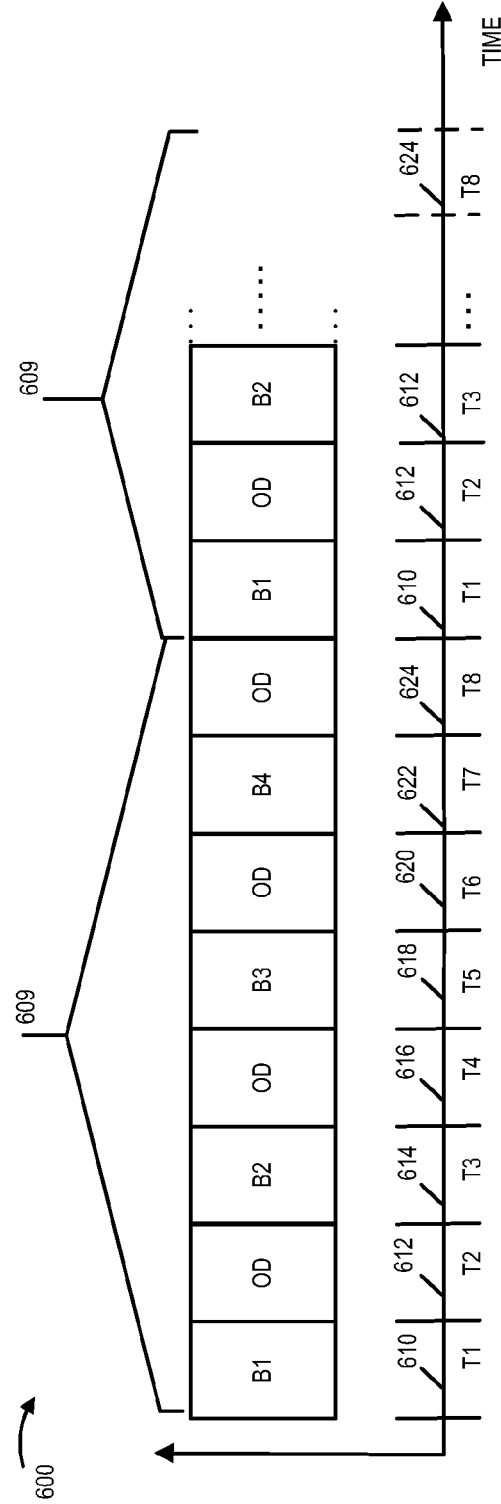
FIGURE 5
FIGURE 6

COMMUNICATIONS METHODS AND APPARATUS FOR SUPPORTING COMMUNICATIONS WITH PEERS USING MULTIPLE ANTENNA PATTERNS

FIELD

Various embodiments relate to wireless communications methods and apparatus and, more particularly, to wireless communications methods and apparatus for transmitting information using multiple antenna patterns.

BACKGROUND

In a peer to peer communications system, peer communications devices may periodically or non periodically transmit peer discovery information, e.g., peer discovery signals. The peer discovery information may include, e.g., identification information, so that a receiving device may identify the transmitting peer device and establish communications if the transmitting device is of interest to the receiving device. In some systems the peer discovery information is transmitted using an omni-directional antenna. Although peer discovery signals transmitted using an omni-directional antenna may easily reach neighboring peer devices in close vicinity to the transmitting device, the range of the omni-directional antenna can be limited by transmission power constraints and the failure to focus the transmitted energy in a beam. An advantage of using an omni-directional antenna pattern is that devices within the omni-directional antenna pattern coverage area, will be able to detect each of the transmitted signals regardless of their position relative to the transmitting device.

While the use of a beam antenna pattern may provide greater range than an omni-directional pattern for a given total amount of transmission power, the use of a focused beam to transmit peer discovery signals has the drawback that nearby devices which are not inside the transmitted beam may not detect the transmitted peer discovery signals even though they are in close proximity to the transmitting device. While rotating or changing the transmission beam direction over time may have the advantage of allowing devices surrounding the transmitted device to detect the discovery signals at a greater distance than when an omni-directional pattern is used, there may be a significant delay in detection time as compared to the omni-directional case depending on the location of the receiving device and the amount of time required for the beam to compete a full rotation. This is particularly the case where multiple peer discovery transmissions are required before a decision on whether to contact the transmitting device can be made by the receiving device, e.g., because part of the full information needed for the decision is transmitted in each of the multiple different peer discovery transmission time periods.

In view of the above discussion it should be appreciated that it would be beneficial if methods and apparatus could be developed which would provide at least some of the range benefits of using beamforming antenna patterns without necessarily subjecting all receiving devices to the delays associated with having to wait for a beam to rotate around.

SUMMARY

Methods and apparatus for wireless communications in networks, e.g., regional ad hoc peer to peer networks, are described. Among the described methods and apparatus are methods and apparatus for communicating information, e.g., peer discovery information to peer communications devices. In various embodiments different antenna patterns are used in different periods of time, e.g., peer discovery transmission time periods, so that peer discovery information will be transmitted to at least some different coverage areas during different periods of time.

An exemplary method of operating a communications device, in accordance with one exemplary embodiment comprises transmitting first peer discovery information during a first period of time using a first antenna pattern, and transmitting second peer discovery information during a second period of time using a second antenna pattern. The first and second antenna patterns are different. In at least some embodiments the first antenna pattern is a beam antenna pattern, and said second antenna pattern is an omni-directional antenna pattern. In some embodiments, an omni-directional antenna pattern is used in more transmission time periods than any one particular individual beam pattern which is used. However, this is not the case in all embodiments. In some embodiments, an omni-directional antenna pattern is used in combination with four or more different beam antenna patterns. In some but not necessarily all embodiments, an omni-directional antenna pattern is used in 50% or more of the available transmission time periods. However, in other embodiments the omni-directional pattern is used in a smaller percentage of the available time periods.

One exemplary communications device comprises: at least one processor configured to transmit first peer discovery information during a first period of time using a first antenna pattern, and transmit second peer discovery information during a second period of time using a second antenna pattern. The communications device may, and in some embodiments does, include a memory coupled to said at least one processor. The first and second antenna patterns may be, e.g., a beam antenna pattern and an omni-directional antenna pattern but could be different beam patterns or any of a variety of different antenna patterns.

In addition to exemplary methods and apparatus, various aspects are directed to a computer program product for use in a communications device, comprising a computer readable medium comprising: code for causing at least one computer to transmit first peer discovery information during a first period of time using a first antenna pattern, and code for causing the at least one computer to transmit second peer discovery information during a second period of time using a second antenna pattern.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIGS. 3A, 3B, 3C, 3D and 3E, illustrate various antenna patterns radiated by an exemplary antenna assembly, in accordance with one exemplary embodiment.

FIG. 5 illustrates an exemplary recurring peer discovery information transmission schedule.

FIG. 6 illustrates one example that shows different time periods during which an antenna assembly may radiate signals using different exemplary antenna patterns, in accordance with an exemplary embodiment.

DETAILED DESCRIPTION

Figure 1:
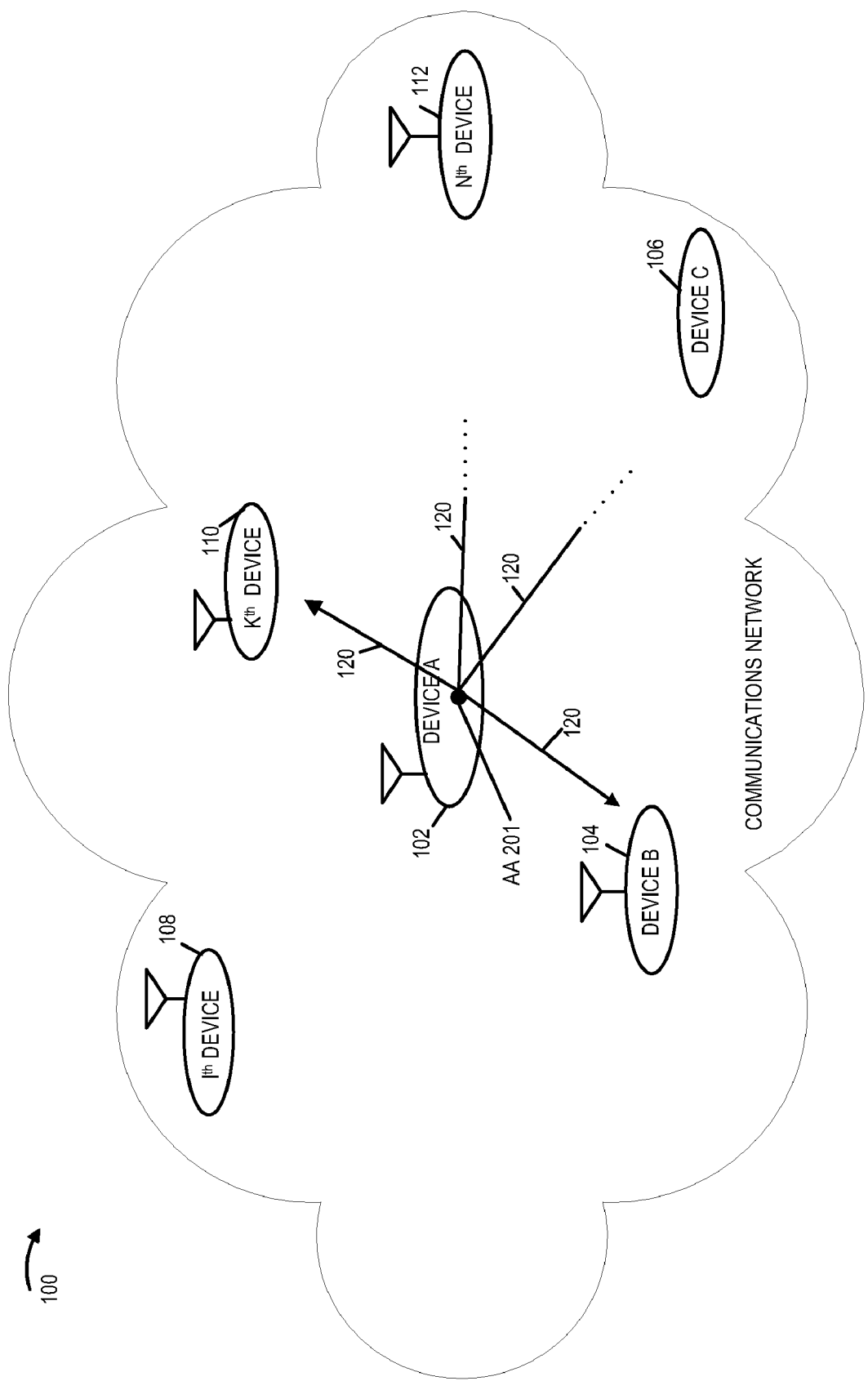
FIG. 1 illustrates an exemplary peer to peer wireless communications network, in accordance with an exemplary embodiment.

FIG. 1 illustrates an exemplary peer to peer communications network 100, e.g., an ad-hoc peer to peer communications network, implemented in accordance with one exemplary embodiment. Exemplary communications network 100 includes a plurality of wireless peer to peer communications devices including communications device A 102, communications device B 104, communications device C 106, $I^{th}$ communications device 108, $K^{th}$ communications device 110, . . . and $N^{th}$ communications device 112. The communications devices 102, 104, 106, 108, 110, 112 may be, e.g., mobile terminals, which support peer to peer communications. Exemplary communications network 100, in some embodiments may also include other devices such as access routers, relay stations etc. The wireless communications devices 102, 104, 108, . . . , 112 support various signaling between peers, e.g., peer discovery signals, transmission request signals etc., and data transmissions. Some of the peer to peer communications devices 102, 104, 108 are mobile communications devices, e.g., handheld mobile communications devices, while some others, e.g., 110, may be fixed devices.

In accordance with one exemplary embodiment, one or more communications devices in network 100 periodically broadcasts peer discovery information, e.g., in the form of peer discovery signals, to a number of other communications devices in the communications network 100. For the purpose of illustration and as an example, communications device A 102 is shown transmitting peer discovery signal 120 to a plurality of other devices. However, it should be appreciated that other communications devices in the network 100, may also be transmitting peer discovery signals. As shown in FIG. 1, the communications device A 102 broadcasts peer discovery signal 120 including peer discovery information, which may be received by one or more of other devices in the network 100.

In accordance with one aspect, a communications device, e.g., device A 102, broadcasts peer discovery signals communicating peer discovery information using different antenna patterns during different periods of time. For example, device A 102 may broadcast peer discovery signal 120 including first peer discovery information, using a first antenna pattern, e.g., omni-directional antenna pattern, during a first period of time. Then device A 102 may broadcast peer discovery signal including second peer discovery information, which may be the same or different from the first peer discovery information, using a second antenna pattern, e.g., a beam antenna pattern, during a second period of time. Over time the direction of the beam pattern may be changed with use of the omni-directional pattern being interspaced with use of the beam pattern or patterns over time. Thus, in some embodiments, one or more communications devices, e.g., device A 102 in the network 100, includes an antenna assembly, e.g., antenna assembly 201, capable of radiating signals using different antenna patterns. While the antenna pattern may alternate between omni-directional and beam, the patterns may be used sequentially, e.g., with multiple beam patterns being used in sequence. The communications device A 102 using the antenna assembly can control the antenna assembly to operate in different transmission modes of operation, e.g., a beamforming transmission mode, an omni-directional transmission mode of operation, etc. Different beam antenna patterns may be used during the beamforming transmission mode of operation. In some embodiments one or more signals, e.g., peer discovery signal 120, transmitted during a beamforming transmission mode using a beam antenna pattern are stronger, e.g., at least 3 dB stronger for a given location within the beam coverage area, compared to signals transmitted using an omni-directional antenna pattern, when the signals are transmitted using same total transmit power level. Thus, it should be appreciated that peer discovery signal 120 transmitted using beam antenna pattern can reach out to peer communications devices which are farther away from the transmitting peer device, i.e., device A 102 than can be reached when a omni-directional pattern is used.

Figure 2:
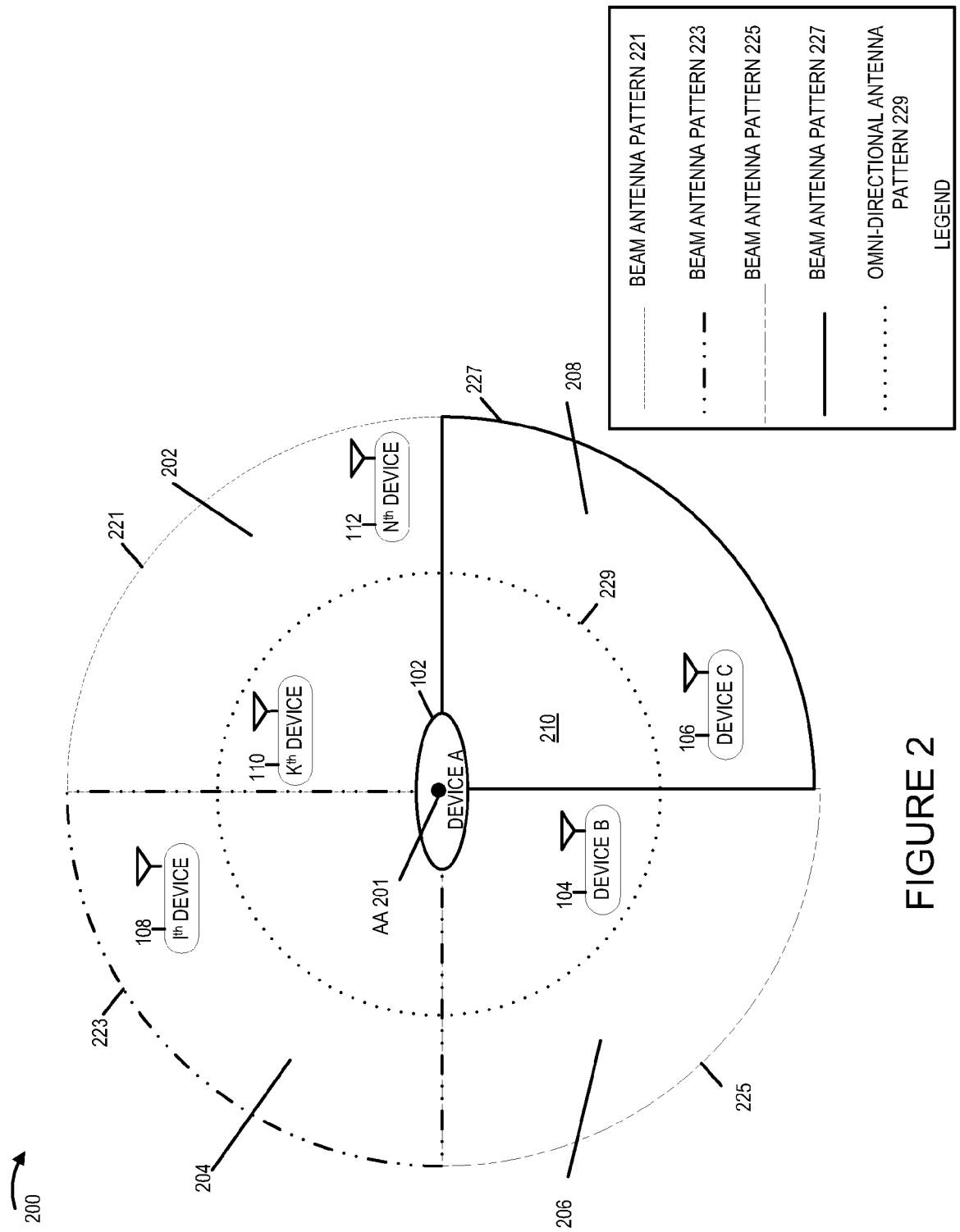
FIG. 2 is an illustration of an exemplary communications device that includes an antenna assembly which can radiate signals using various antenna patterns, in a region with various other exemplary communications devices, in accordance with one exemplary embodiment.

FIG. 2 is a drawing 200 showing communications device A 102, that includes an antenna assembly (AA) 201 which can radiate signals using various antenna patterns. The antenna patterns include first through fourth beam antenna patterns 221, 223, 225, and 227 and omni-directional pattern 229. Communications devices, e.g., communications device B 104, communications device C 106, $I^{th}$ communications device 108, $K^{th}$ communications device 110, and $N^{th}$ communications device 112 are located within different antenna pattern coverage areas as shown. Although communications device A 102 is shown to include antenna assembly 201, it should be noted that one or more of the other communications devices shown in FIG. 2 may also include similar antenna assemblies. In accordance with an exemplary embodiment antenna assembly 201 is capable of radiating signals using the different antenna patterns 221, 223, 225, 227 and 229. In accordance with one aspect in some embodiments device A 102, controls the antenna assembly 201 to operate in different transmission modes during different transmission time periods. In some embodiments during first through fourth beamforming transmission time periods, the antenna assembly transmits signals using a corresponding one of the first through fourth beam antenna pattern 221, 223, 225, 227 and during an omni-directional transmission mode of operation transmits signals using the omni-directional antenna pattern 229. As shown in FIG. 2, in this particular example communications device A using the antenna assembly 201, transmits peer discovery signals including peer discovery information, using the omni directional antenna pattern 229 during a time period. The transmitted signals can reach devices that fall within the omni-directional coverage region 210, e.g., device B 104 and $K^{th}$ device 110. It should be appreciated that the signal strength of the peer discovery signals transmitted using the omni directional antenna pattern 210 grow weak outside the omni-directional coverage area 210 and thus such a signal may not be properly decoded by a communications devices outside region 210. For example communications device C 106 and $I^{th}$ communications device 108 may not be able to recover signals transmitted by device A 102 using omni-directional antenna pattern 229.

In accordance with one aspect during different time periods, communications device A 102 transmits peer discovery signals including peer discovery information, using different individual ones of beam antenna patterns 221, 223, 225 and 227. The peer discovery signal transmission time periods in which a beamforming pattern is used can, and in some embodiments are, interspaced with time periods in which the omni-directional pattern 229 is used. The communications device A 102 controls the antenna assembly 201 to create different beam antenna patterns, e.g., beam patterns 221, 223, 225 and 227 covering different quadrants in the region at different time periods. For example, as shown in FIG. 2, antenna assembly 201 in a first beamforming transmission mode may create first beam antenna pattern 221 covering the first quadrant, e.g., 0-90 degrees. During a second mode, beam antenna pattern 223 is used corresponding to a 90-180 degree pattern and coverage area 204. During a third mode beam antenna pattern 225 is used covering a 180-270 degree pattern and coverage area 206. During a fourth mode, beam antenna pattern 227 is used covering a 270-360 degree pattern and coverage area 208. One of the advantages of using a beam antenna pattern to transmit peer discovery signals is that the transmitted signals are stronger, in some embodiments 3 dB stronger within the beam, compared to signals transmitted using an omni-directional antenna pattern, thus permitting the beam to extend further out from the transmitting device than when signals are transmitted using the same transmit power and the omni-directional pattern 229. Thus signals transmitted using beam antenna pattern cover a greater range within a region covered by the beam and can be decoded successfully by distant peer devices farther away from device A 102, such as communications device C 106, $I^{th}$ device 108 and $N^{th}$ device 112 in this example. If we continue with the example of four beam antenna patterns, each being used in a different time period, we see that one drawback of transmitting peer discovery signals using the beam antenna patterns in different time periods is that neighboring peer devices such as device B 104 in this example, may receive discovery signals from the transmitting device A 102 once during every four discovery transmission time periods. Given that in some cases multiple discovery signals may need to be received before the receiving device can make a reliable determination whether or not the transmitting device is of interest and should be contacted, the delay before reliable discovery may be achieved can be considerable. One approach, used in some embodiments, to reduce the possible delay which can be caused by switching between beam patterns includes the use of an omni-directional antenna pattern in a first percentage, e.g., 50% or more, of the available transmission time slots and use one or more of beam antenna patterns in, e.g., the remaining available transmission time slots, e.g., 50% of the time slots. In this manner devices close to the transmitting device can discover the transmitting device promptly while devices farther away, and thus which are less likely to be interested in the transmitted discovery information, can still detect the information but perhaps take longer to do so than nearby devices. More distant devices may be less interested than the nearby devices because the transmitted discovery information may relate to a service or product from a location at or near the transmitting device which can be far away from the receiving device or because power constraints, e.g., available battery power limitations, may make communications difficult between distant devices.

To combine the range advantage of using antenna beams with the omni-directional advantage of using an omni-directional antenna pattern in one embodiment, beam and omni-directional antenna patterns are used by a device at different times. For example in one particular exemplary embodiment, communications device A 102 controls antenna assembly 201 to transmit peer discovery information using beam antenna pattern 221, 223, 225 and 227 during a first, second, third and fourth transmission time slots respectively. Further, in the next transmission time slot, e.g., a fifth time slot device A 102 controls antenna assembly 201 to transmit peer discovery information using omni-directional antenna pattern. It should be appreciated that this is just an example, and a variety of other ways to time multiplex between different antenna patterns in different transmission time slots are possible.

Figure 3E:
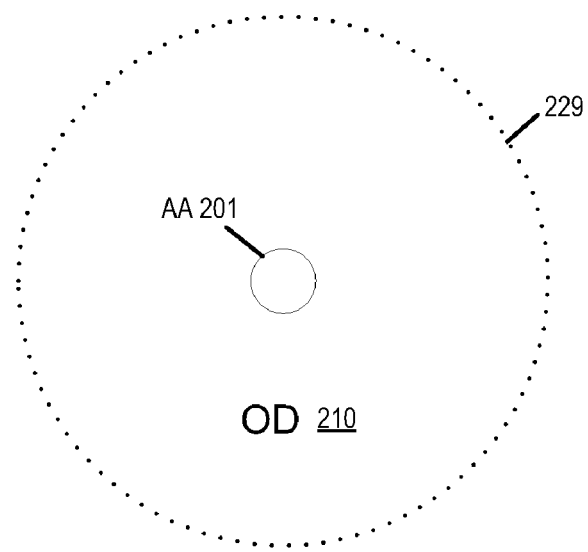

FIGS. 3A, 3B, 3C, 3D and 3E, illustrate various exemplary antenna patterns radiated by the antenna assembly (AA) 201 shown in FIG. 2, at different times, in accordance with one exemplary embodiment. Various antenna patterns shown in FIGS. 3A, 3B, 3C, 3D and 3E, have been identified using the same reference numbers used for identifying the antenna patterns in FIG. 2. FIG. 3A shows a beam antenna pattern 221 (B1) with a width, e.g., around 90 degrees, and the signals transmitted using antenna pattern B1 221 may, for example, be successfully received and decoded by other devices in region 202.

FIG. 3B shows another beam antenna pattern 223, e.g., B2, radiated by the antenna assembly 201 while operating in a second beamforming transmission mode of operation. During the second beamforming mode of operation area 204 is covered by the transmitted beam. The signals transmitted using the beam antenna pattern 223 can cover, for example, 90-180 degrees. FIG. 3C shows yet another beam antenna pattern 206, e.g., B3, radiated by the antenna assembly 201 during a third beamforming mode of operation. The signals transmitted using the beam antenna pattern 225 may cover, for example, 180-270 degrees which corresponds to coverage area 206. FIG. 3D shows yet another beam antenna pattern 227, e.g., B4, radiated by the antenna assembly 201 during a fourth beamforming mode of operation. The signals transmitted using the beam antenna pattern 227 may cover, for example, 270-360 degrees which corresponds to coverage area 208. While different beamforming antenna patterns may be used, when transmitting using any one of the first through fourth beamforming antenna patterns the transmitting device operates in a beamforming mode of operation. When transmitting using an omni-directional antenna pattern, the transmitting device operates in an omni-directional mode of operation.

FIG. 3E shows an omni-directional antenna pattern (OD) 229 which the communications device A 102 uses during an omni-directional mode of operation, to transmit peer discovery signals 120. In some embodiments, communications device A 102 uses omni-directional antenna pattern 210 in 50% of the peer discovery transmission time slots and one of the first through fourth beam antenna patterns in the remaining 50% of peer discovery transmission time slots. In some, but not necessarily all such embodiments, use of an omni-directional antenna pattern occurs between each time slot in which a beam antenna pattern is used. Thus, in one such embodiment a neighboring peer device within the omni-directional coverage area 210 will detect peer discovery signal 120 from device A 102 five times every eight time slots. However a device outside area 210 but within the coverage area of one of the beam patterns 221, 223, 225 and 227 will receive a peer discovery signal once every eight time slots. It should be appreciated that the peer discovery signals transmitted using different antenna patterns discussed above, e.g., B1 221, B2 223, B3 225, B4 227 and OD 229, may include the same or different peer discovery information in each transmission time slot.

Figure 4:
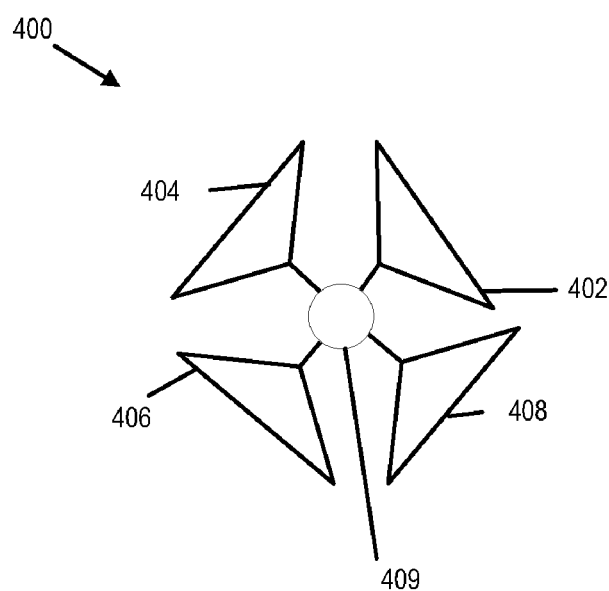
FIG. 4 illustrates an exemplary antenna assembly which can be used in one or more communications devices shown in FIGS. 1 and 2.

FIG. 4 illustrates an exemplary antenna assembly 400 which can be used in one or more of the communications devices shown in FIGS. 1 and 2. Exemplary antenna assembly 400 includes four directional transmit antenna elements 402, 404, 406 and 408 each of which covers a different quadrant. The antenna assembly 400 also includes an omni-directional antenna element 409. Each of the antenna elements 402, 404, 406, and 408 may be used independently to form a different one of the beam patterns 221, 223, 225, 227. The omni-directional element 409 can be used individually to generate omni-directional pattern 229. Alternatively element 409 may be omitted and elements 402, 404, 406 and 408 can be used simultaneously to generate omni-directional pattern 229. Using the different antenna elements 402, 404, 406, 408 and 409, the antenna assembly 400 can create different antenna patterns, such as the beam antenna patterns and omni-directional antenna pattern discussed in FIGS. 2 and 3.

FIG. 5 is a drawing 500 illustrating an exemplary recurring peer discovery information transmission schedule. The illustrated schedule 500 repeats over a recurring interval 510 of N peer discovery time periods also sometimes referred to as peer discovery time slots. Each of the N different peer discovery time periods corresponds to one of M antenna patterns where M≦N and M and N are positive integers. Thus, depending on the embodiment a particular antenna pattern may be used one or more times during the recurring N time period interval 510.

FIG. 6 is a drawing 600 showing one particular exemplary recurring peer discovery information transmission schedule where N=8 and M=5. The 5 supported antenna patterns include four beamforming antenna patterns B1, B2, B3, B4 and an omni-directional pattern OD. Antenna patterns B1, B2, B3 and B4 may be generated using antenna elements 402, 404, 406 and 408 respectively and correspond to antenna patterns 221, 223, 225, 227 respectively shown in FIGS. 3A, 3B, 3C and 3D respectively.

Note that in the FIG. 6 example, the recurring time interval 609 includes 8 peer discovery transmission time periods T1 610, T2 612, T3 614, T4 616, T5 618, T6 620, T7 622, T8 624. In the FIG. 6 example, every other time period 612, 616, 620, 624 uses the omni-directional antenna pattern 229 while a different one of the four beam antenna patterns is used once during the recurring interval 609 in the specific order shown in FIG. 6. The antenna pattern used in a given peer discovery time period within recurring interval 609 remains the same as the pattern repeats with time. The antenna pattern sequence and/or length of interval 609 may be predetermined and known, or communicated with or as part of peer discovery information transmitted in one or more of the peer discovery transmission time periods 610, 612, 614, 616, 618, 620, 622, 624. Thus in the FIG. 6 example, the transmitting device operates in an omni-directional mode of operation 50% of the time where an omni-directional antenna pattern is used and operates in a beamforming mode of operation the remaining time. Thus during 50% of the time in which the transmitting device operates in a beamforming mode, the transmitting device will use one or more of the supported beam antenna patterns, e.g., with one of the beam patterns being used in each peer discovery time slot in which a beam antenna pattern in used.

Figure 7:
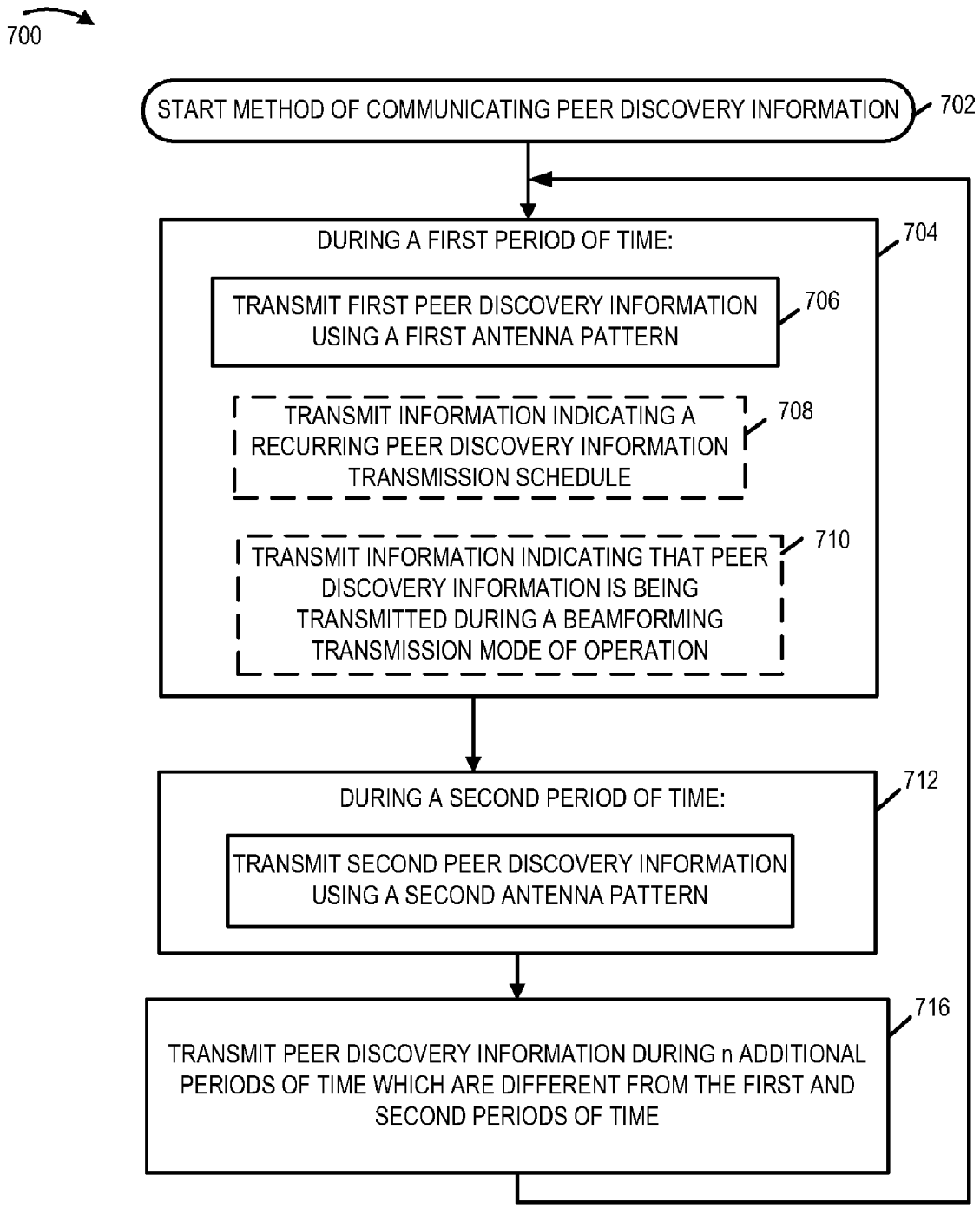
FIG. 7 is a flowchart of an exemplary method of communicating peer discovery information from a communications device, in accordance with one exemplary embodiment.

FIG. 7 is a flowchart 700 of an exemplary method of communicating peer discovery information, in accordance with one exemplary embodiment. For the purpose of illustration, we will consider an example wherein peer discovery information is communicated from communications device A 102 to one or more other devices in the network 100. However, it should be appreciated that the method of flowchart 400 can be implemented by other devices in the exemplary communications network 100 as well. The peer discovery information may be included in a peer discovery signal, e.g., signal 120, which one or more communications devices, e.g., devices in network 100, can transmit to one another with a peer discovery signal 120 being transmitted in each time slot of recurring peer discovery transmission interval such as the interval 510 of FIG. 5 or the interval 609 of FIG. 6. Operation of the exemplary method starts in step 702 where communications device A 102 is powered on and initialized. Operation proceeds from start step 702 to step 704.

In step 704 communications device A 102 performs, during a first period of time, one or more of the steps 706, 708 and 710 included in step 704. Steps 708 and 710 are optional. Thus steps 708 and/or 710 are not performed in some embodiments. The first period of time, may and in some embodiments is, a first peer discovery transmission interval also sometimes referred to as a peer discovery time slot. The first period of time may be, e.g., the time period corresponding to time period 610 of FIG. 6. During the operation the communications device A 102 controls the antenna assembly 201 to transmit signals using one or more antenna patterns. In step 706 communications device A 102 transmits first peer discovery information, e.g., in one of the peer discovery signals 120, using a first antenna pattern. In some embodiments, the first antenna pattern is a beam antenna pattern, such as B1 221, B2 223, B3 225 or B4 227. For example in FIG. 6, pattern B1 is used in time slot 610. Thus in step 706 antenna assembly 201 is controlled to transmit peer discovery signals including first peer discovery information, using a beam antenna pattern, to other peer communications devices in the network 100. In optional step 708, communications device A 102 transmits information indicating a recurring peer discovery information transmission schedule. In some embodiments the information indicating recurring peer discovery information transmission schedule is included in the peer discovery signal 120. In some embodiments the information indicating recurring peer discovery information transmission schedule may be transmitted in a different signal. The information indicating the recurring peer discovery information transmission schedule transmitted in step 708 may, for example, communicate how different antenna patterns are periodically used to transmit peer discovery signals on a periodic basis.

In optional step 710, communication device A 102 transmits information indicating that the first peer discovery information is being transmitted during a beamforming transmission mode of operation, e.g., using beamforming antenna pattern. When the antenna pattern used in the first period of time is an omni-directional antenna pattern step 710 is skipped. This information transmitted in step 710, for example, may also indicate that the peer discovery signal 120 is being or was transmitted during a beam antenna pattern transmission time slot. It should be appreciated that using the recurring peer discovery information transmission schedule, and/or the information indicating that peer discovery information is being transmitted during a beamforming transmission mode of operation, the device receiving the information may know when it can expect to receive the transmission from device A 102 again. In some embodiments, the receiving device may monitor at a reduced rate and/or cease monitoring for peer discovery signals during at least some peer discovery periods between the periods of time it expects to be able to receive additional transmissions from device A 102.

Operation proceeds from step 704 which includes step 706, and optional steps 708 and 710, to step 712. In step 712 communications device A 102, during a second period of time, transmits second peer discovery information using a second antenna pattern which is different from the first antenna pattern. The second peer discovery information may be included in a peer discovery signal such as signal 120, transmitted during a second period of time, e.g., peer discovery time period 612. The first and second peer discovery information can be the same or different. In some embodiments, the second antenna pattern is, e.g., omni-directional antenna pattern 210. In some embodiments the first and second periods of time are part of the recurring peer discovery information transmission schedule, e.g., schedule 600. Thus in at least one embodiment, during said first period of time, beam antenna pattern, e.g., B1, is used and during said second period of time the omni-directional antenna pattern OD is used.

Operation proceeds from step 712, to step 716. In step 716 communications device A 102 transmits peer discovery information during n additional time periods which are different from the first and second periods of time. In some embodiments a different one of n different beam antenna patterns is used during each one of the n additional time periods, n being a positive integer. For example, if beam antenna pattern B1 221 is used during the first time period, then beamforming antenna patterns such as B2 223, B3 225, B4 227, and many more possible different beam antenna patterns may be used during the n additional time periods, e.g., with one pattern being used per time period. However, in some embodiments, there are more time periods in which an omni-directional antenna pattern is used in the recurring transmission schedule than there are time periods corresponding to any beam antenna pattern. In some such embodiments use of an omni-directional pattern may occur between the use of beam antenna patterns. Operation proceeds from step 716 back to step 704 as the process repeats over time.

Figure 8:
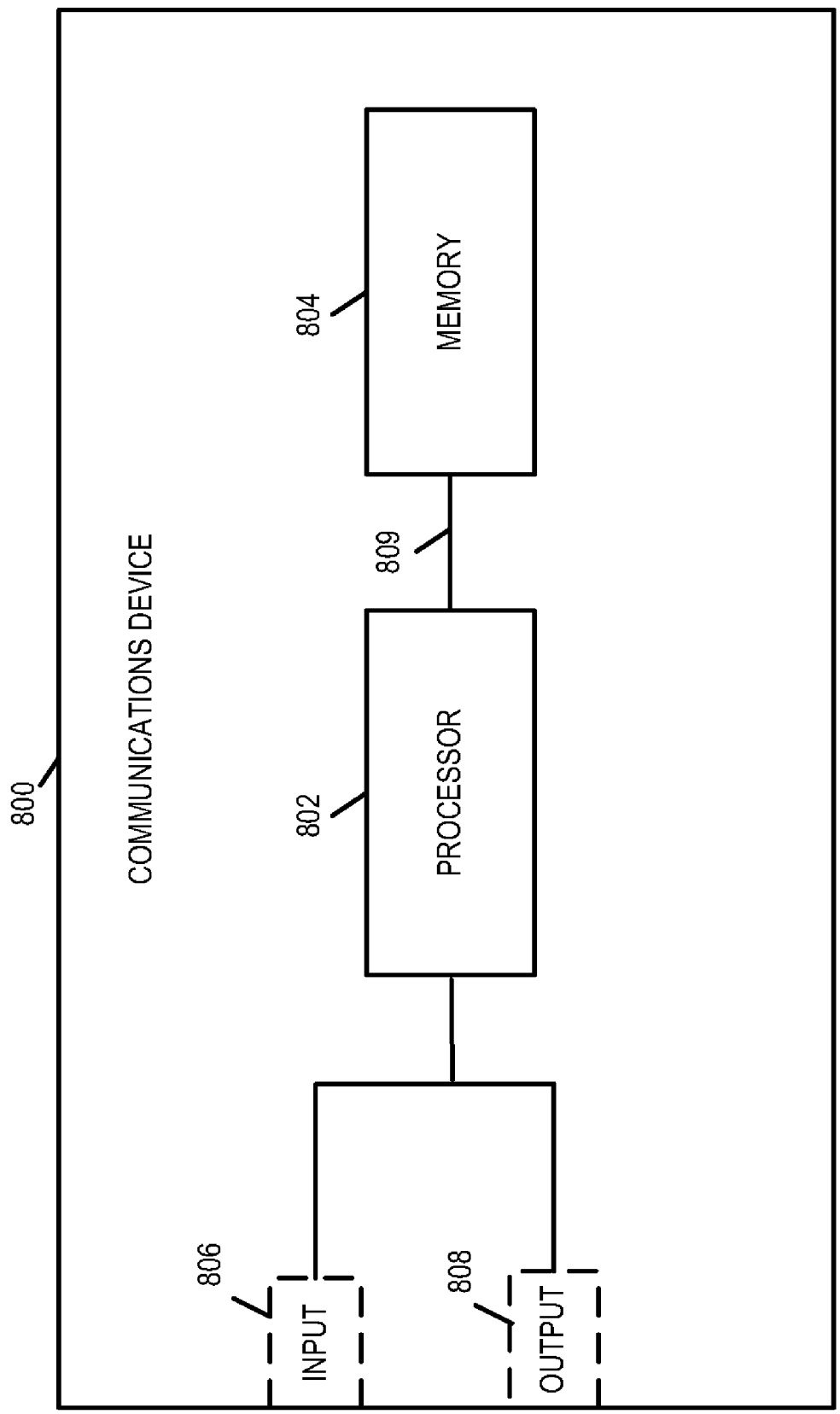
FIG. 8 illustrates an exemplary peer to peer communications device which can be used in the exemplary system shown in FIG. 1.

FIG. 8 is a drawing of an exemplary communications device 800 in accordance with one exemplary embodiment. Communications device 800 may be, and in at least one embodiment is, a mobile wireless terminal supporting peer to peer communications and implementing a method in accordance with flowchart 700 of FIG. 7. The communications device 800 may be used as the communication device A 102 of FIG. 1. Communications device 800 includes a processor 802 and memory 804 coupled together via a bus 809 over which the various elements (802, 804) may interchange data and information. Communications device 800 further includes an input module 806 and an output module 808 which may be coupled to the processor 802 as shown. However, in some embodiments the input module and output module 806, 808 are located internal to the processor 802. Input module 806 can receive input signals. Input module 806 can, and in some embodiments does, include a wireless receiver and/or a wired or optical input interface for receiving input. Output module 808 may include, and in some embodiments does include, a wireless transmitter and/or a wired or optical output interface for transmitting output. Processor 802, in some embodiments, is configured to transmit first peer discovery information during a first period of time using a first antenna pattern, and transmit second peer discovery information during a second period of time using a second antenna pattern, the second antenna pattern being different from the first antenna pattern. The first and second peer discovery information may, and in some embodiments are, the same. In some other embodiments the first and second peer discovery information may be different. In some embodiments, the first and second periods of time are part of a recurring peer discovery information transmission schedule.

In some embodiments the first antenna pattern is a beam antenna pattern, and the second antenna pattern is an omni-directional antenna pattern.

In some embodiments the processor 802 is further configured to transmit, during said first period of time, information indicating the recurring peer discovery information transmission schedule. The processor 802 may and in some embodiments is, further configured to transmit, during the first period of time, information indicating that the peer discovery information is being transmitted during a beamforming transmission mode of operation. In some embodiments the processor 802 is further configured to transmit peer discovery information during n additional time periods which are different from said first and second periods of time. In some embodiments a different one of n different beam antenna patterns is used during each of the n additional time periods, n being a positive integer. However, in some embodiments there are more time periods in which an omni-directional antenna pattern is used in said recurring peer discovery information transmission schedule than there are time periods corresponding to any individual beam antenna pattern.

Figure 9:
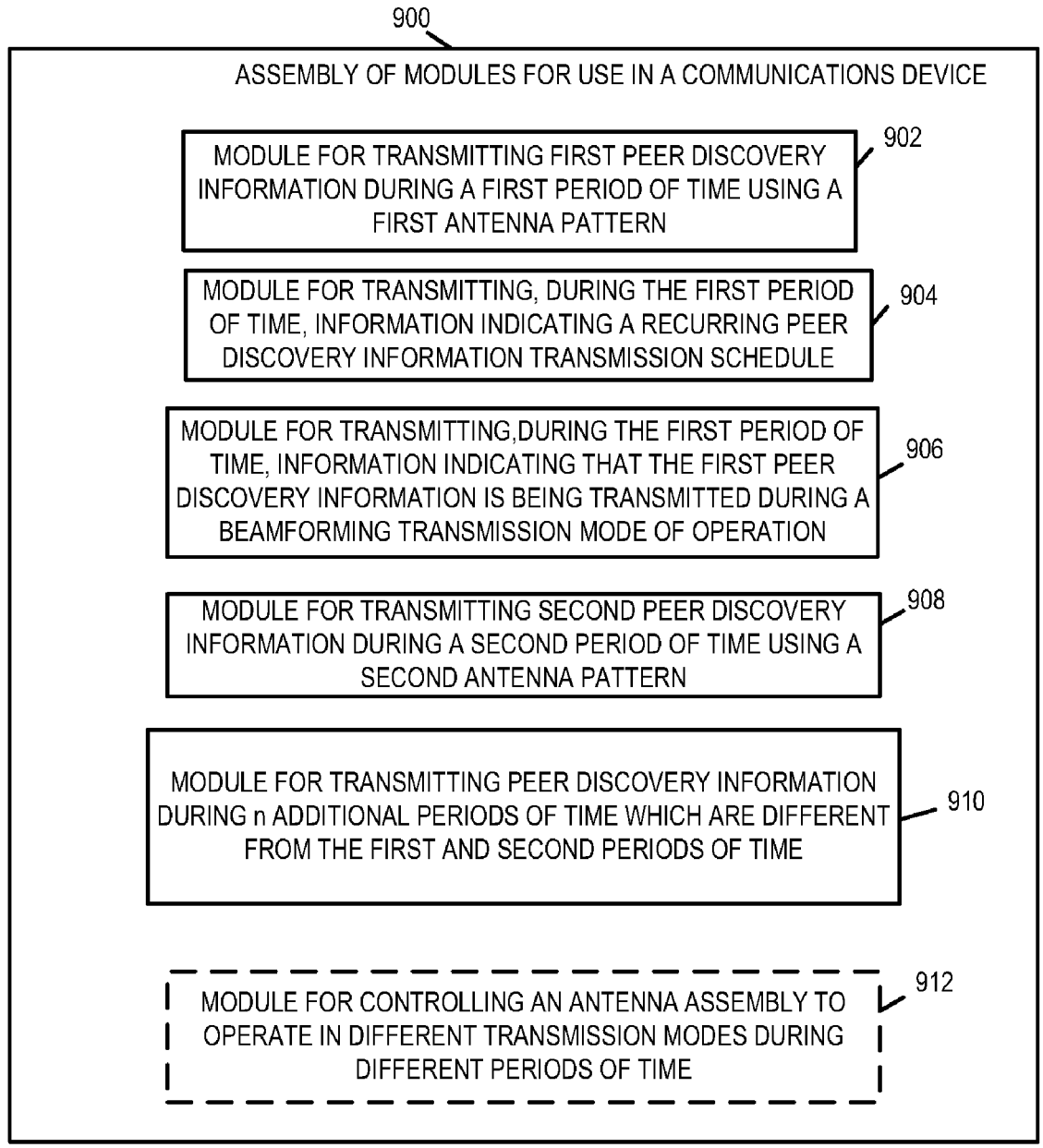
FIG. 9 illustrates an assembly of modules which can be used in the exemplary communications device of FIG. 8.

FIG. 9 is an assembly of modules 900 which can, and in some embodiments are, used in the communications device illustrated in FIG. 8. The modules in the assembly 900 can be implemented in hardware within the processor 802 of FIG. 8, e.g., as individual circuits. Alternatively, the modules may be implemented in software and stored in the memory 804 of the communications device 800 shown in FIG. 8. While shown in the FIG. 8 embodiment as a single processor, e.g., computer, it should be appreciated that the processor 802 may be implemented as one or more processors, e.g., computers.

When implemented in software the modules include code, which when executed by the processor 802, configure the processor to implement the function corresponding to the module. In embodiments where the assembly of modules 900 is stored in the memory 804, the memory 804 is a computer program product comprising a computer readable medium comprising code, e.g., individual code for each module, for causing at least one computer, e.g., processor 802, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 9 control and/or configure the communications device 800 or elements therein such as the processor 802, to perform the functions of the corresponding steps illustrated in the method flow chart 700 of FIG. 7.

As illustrated in FIG. 9, the assembly of modules 900 includes a module 902 for transmitting first peer discovery information during a first period of time using a first antenna pattern, a module 904 for transmitting information indicating a recurring peer discovery information transmission schedule during the first period of time, a module 906 for transmitting information indicating that the first peer discovery information is being transmitted during a beamforming transmission mode of operation, and a module 908 for transmitting peer discovery information during a second period of time using a second antenna pattern which is different from the first antenna pattern. In some embodiments the first and second periods of time are part of the recurring peer discovery information transmission schedule. The first and second peer discovery information may, and in some embodiments are, the same.

In some embodiments the assembly of modules 900 further includes a module 910 for transmitting peer discovery information during n additional time periods which are different from the first and second periods of time. In some embodiments a different one of N beam antenna patterns is used during each of the n additional time periods, n being a positive integer, and an optional module 912 for controlling an antenna assembly to operate in different transmission modes during different periods of time. In some embodiments, n is 1, 2, 3 or a larger integer value. In some embodiments the first antenna pattern is a beam antenna pattern and the second antenna pattern is an omni-directional antenna pattern. In some embodiments an omni-directional antenna pattern is used more than any one beam antenna pattern.

For the above discussion it should be appreciated that numerous variations and embodiments are possible.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, message generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of communicating peer discovery information, the method comprising:
    transmitting first peer discovery information during a first period of time using a first antenna pattern;
    transmitting second peer discovery information during a second period of time using a second antenna pattern, said first and second antenna patterns being different; and
    transmitting peer discovery information during n additional periods of time which are different from said first and second periods of time, a different one of n different beam antenna patterns being used during each of the n additional periods of time, n being a positive integer.

2. The method of claim 1, wherein said first and second periods of time are part of a recurring peer discovery information transmission schedule.

3. The method of claim 2, further comprising: transmitting, during said first period of time, information indicating the recurring peer discovery information transmission schedule.

4. The method of claim 1, wherein said first antenna pattern is a beam antenna pattern, and said second antenna pattern is an omni-directional antenna pattern.

5. The method of claim 4, wherein said first and second periods of time are part of a recurring peer discovery information transmission schedule; and
wherein there are more periods of time in which an omni-directional antenna pattern is used in said recurring peer discovery information transmission schedule than there are periods of time corresponding to any individual beam antenna pattern.

6. A communications device comprising:
at least one processor configured to:
transmit first peer discovery information during a first period of time using a first antenna pattern; and
transmit second peer discovery information during a second period of time using a second antenna pattern, said first and second antenna patterns being different;
transmit peer discovery information during n additional periods of time which are different from said first and second periods of time, a different one of n different beam antenna patterns being used during each of the n additional periods of time, n being a positive integer; and
a memory coupled to the at least one processor.

7. The communications device of claim 6, wherein said first and second periods of time are part of a recurring peer discovery information transmission schedule.

8. The communications device of claim 7, wherein the at least one processor is further configured to: transmit, during said first period of time, information indicating the recurring peer discovery information transmission schedule.

9. The communications device of claim 6, wherein said first antenna pattern is a beam antenna pattern, and said second antenna pattern is an omni-directional antenna pattern.

10. The communications device of claim 9, wherein said first and second periods of time are part of a recurring peer discovery information transmission schedule; and
wherein there are more periods of time in which an omni-directional antenna pattern is used in said recurring peer discovery information transmission schedule than there are periods of time corresponding to any individual beam antenna pattern.

11. A communications device comprising:
means for transmitting first peer discovery information during a first period of time using a first antenna pattern;
means for transmitting second peer discovery information during a second period of time using a second antenna pattern, said first and second antenna patterns being different; and
means for transmitting peer discovery information during n additional periods of time which are different from said first and second periods of time, a different one of n different beam antenna patterns being used during each of the n additional periods of time, n being a positive integer.

12. The communications device of claim 11, wherein said first and second periods of time are part of a recurring peer discovery information transmission schedule.

13. The communications device of claim 12, further comprising: means for transmitting, during said first period of time, information indicating the recurring peer discovery information transmission schedule.

14. The communications device of claim 11, wherein said first antenna pattern is a beam antenna pattern, and said second antenna pattern is an omni-directional antenna pattern.

15. A computer program product for use in a communications device, comprising:
a non-transitory computer readable medium comprising:
code for causing at least one computer to transmit first peer discovery information during a first period of time using a first antenna pattern;
code for causing the at least one computer to transmit second peer discovery information during a second period of time using a second antenna pattern, said first and second antenna patterns being different; and
code for causing the at least one computer to transmit peer discovery information during n additional periods of time which are different from said first and second periods of time, a different one of n different antenna patterns being used during each of the n additional periods of time, n being a positive integer.

16. The computer program product of claim 15, wherein said first and second periods of time are part of a recurring peer discovery information transmission schedule.

17. The computer program product of claim 16, wherein the computer readable medium further comprises:
code for causing the at least one computer to transmit, during said first period of time, information indicating the recurring peer discovery information transmission schedule.

* * * * *